United States Patent
Chavez et al.

(10) Patent No.: US 7,606,290 B1
(45) Date of Patent: Oct. 20, 2009

(54) ARCHITECTURE FOR SIGNAL ACQUISITION WITH CYCLIC RANGE SEARCH

(75) Inventors: Carlos J. Chavez, Marion, IA (US); Gunther B. Frank, Robins, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 602 days.

(21) Appl. No.: 11/416,621

(22) Filed: May 3, 2006

(51) Int. Cl.
*H04B 1/00* (2006.01)

(52) U.S. Cl. .................. 375/130; 375/132; 375/135; 375/136; 375/138; 375/147; 342/70; 342/134; 342/465

(58) Field of Classification Search .................. 375/130, 375/134, 135–136, 137, 145, 146–147, 295, 375/316, 131–133, 138, 140–141, 354; 342/70, 342/134, 465
See application file for complete search history.

(56) References Cited

U.S. PATENT DOCUMENTS

| | | | |
|---|---|---|---|
| 7,164,382 B2 * | 1/2007 | Kai | 342/70 |
| 7,463,669 B2 * | 12/2008 | Parizhsky et al. | 375/132 |
| 2005/0093742 A1 * | 5/2005 | Lee et al. | 342/357.15 |
| 2007/0135054 A1 * | 6/2007 | Belcea | 455/67.11 |
| 2008/0204322 A1 * | 8/2008 | Oswald et al. | 342/465 |
| 2008/0231498 A1 * | 9/2008 | Menzer et al. | 342/134 |
| 2009/0060004 A1 * | 3/2009 | Papasakellariou et al. | 375/140 |

OTHER PUBLICATIONS

Wavelets and Wideband Correlation Processing; Lora G. Weiss; IEEE Signal Processing Magazine; Jan. 1994; p. 13-32.

* cited by examiner

*Primary Examiner*—Shuwang Liu
*Assistant Examiner*—Hirdepal Singh
(74) *Attorney, Agent, or Firm*—Daniel M. Barbieri

(57) ABSTRACT

An architecture for a spread-spectrum transmitter-receiver system in an advanced tactical data link that allows the receiver to readily acquire and synchronize to a desired LPD signal. Signal acquisition is performed with a cyclic range search that uses multiple redundant known sequences mapped to a known message sequence in a highly repeated manner. By employing the invariance of the speed of light, and synchronicity between transmitter and receiver, the architecture can significantly reduce the computational complexity of the receiver. Additionally, the architecture enables ad hoc channel access, controlled latency, distance estimation, and distance-directed transmissions.

20 Claims, 1 Drawing Sheet

ARCHITECTURE FOR SIGNAL ACQUISITION WITH CYCLIC RANGE SEARCH

CROSS-REFERENCE TO RELATED APPLICATIONS

This application is filed concurrently with commonly assigned, non-provisional U.S. patent application Ser. No. 11/416,620, entitled "Carrier Frequency Estimation via Symbol Rate Estimation", listing as inventors Carlos J. Chavez, Robert J. Frank, and U.S. patent application Ser. No. 11/416, 619, entitled "Signal Acquisition with Efficient Doppler Search", listing as inventors Carlos J. Chavez, Gunter B. Frank, and Robert J. Frank.

BACKGROUND OF THE INVENTION

1. Field of Invention

The present invention relates generally to the field of command, control, communications, computer, intelligence surveillance, and reconnaissance (C4ISR) hardware and software systems and components, and in particular using spread-spectrum communications.

2. Description of Related Art

TTNT (Tactical Targeting Networking Technology) is an advanced tactical data link currently under development by Rockwell Collins Government Systems and the Advanced Technology Center. Modes supporting Low Probability of Detection (LPD) are a highly desirable addition to existing TTNT functionality. The primary challenge for an LPD receiver is to operate at extremely low signal-to-noise ratio (SNR), often well below negative 20 dB.

Critical to LPD operation is the capability of a receiver to acquire and synchronize to a desired signal. Because an LPD system must operate at extremely low SNR, the known sequence of chips used for signal acquisition must be very long (potentially on the order of 1 million chips) in order to produce reasonable probabilities of detection and false alarm. As a result, the computational complexity of the acquisition signal processing in an LPD receiver may be prohibitive. The present invention presents an architecture for signal acquisition with a cyclic range search. This architecture can significantly reduce the computational complexity of an LPD receiver. Additionally, this architecture enables ad hoc channel access, controlled latency, distance estimation, and distance-directed transmissions In the present invention, certain terms are used, as appreciated by a skilled artisan. Thus "chip" is often defined as "channel bit". A spread spectrum system, such as used by the present invention, achieves its spectral spreading using one or more techniques such as direct sequence, forward error correction, and orthogonal channel coding. Regardless of the technique used, the bits produced by the spreading are often referred to as "chips". These chips are modulated and sent over the channel. This distinguishes the bits created by the spreading technique ("chips") from the information bits going into the spreading technique ("bits"). Note that spread spectrum chips are not required to be binary. "Chip rate" is the rate or frequency at which the chips are transmitted. In a spread spectrum system, the chip rate is much faster than the information bit rate, thus the spectral spreading. "Chip time" is the reciprocal of the chip rate, or the duration in time of a single chip. "Multiple chip times" refers to a period of time that is equal to more than one chip time. A "known sequence" is a sequence of chips (or bits, or symbols) of which an authorized receiver has prior knowledge. The known sequence is typically sent at the beginning of a transmission. The receiver performs a search for the known sequence in order to detect the presence of a desired signal and synchronize its signal processing to it. The process of detecting the presence of a desired signal is often referred to as the signal "acquisition".

SUMMARY OF THE INVENTION

Accordingly, the architecture for the present invention, for signal acquisition with a cyclic range search, has, inter alia, the following main elements:

Transmitter start times constrained to known intervals; each start time interval has a unique known sequence associated with it.

Multiple redundant known sequences transmitted at the beginning of a message in multiple consecutive start time intervals.

A receiver built in accordance with the architecture of the present invention performs a "cyclic range search" as part of its acquisition signal processing.

The architecture of the present invention has the following computational benefits:

The uncertainty in arrival time at the receiver is bounded by the constrained transmitter start times. The possible range of arrival time for a given allowable start time is determined by the possible range of propagation time and the possible range of time error between transmitter and receiver. Note that for an LPD system, the propagation time is a small fraction of the duration of the known sequence. This greatly reduces receiver computational complexity since only a relatively small range of possible arrival time must be searched by the acquisition signal processing.

Receiver processing complexity is further reduced by the number of redundant known sequences. This allows a receiver to split its arrival time search into subsets of the total possible range of arrival times. Each range subset may be searched during consecutive intervals using consecutive known sequences. A receiver performs the arrival time search in a cyclic fashion, where the searches for each range subset are performed in some known order that repeats. This is referred to as a "cyclic range search", as explained further herein.

Furthermore, this architecture enables the following functionality:

Ad Hoc Channel Access: The transmitter start time intervals need only be long enough to contain the full length of a known sequence. A transmitter need never wait longer than the length of a known sequence, which is much shorter than an entire message, before it can begin transmitting a message. Compare this to time-slotted or time-division multiple access (TDMA) systems, where a transmitter must wait for the next time slot that has been allocated to it.

Controlled Latency The ad hoc channel access also means more controlled latency when compare to time-slotted or TDMA systems.

Distance Estimation Because transmitter start times are constrained to known intervals, it is possible for a receiver to estimate the distance between the transmitter and receiver. The limiting factor on the accuracy of this estimation is the time error between transmitter and receiver.

Distance-Directed Messages: A transmitter may include known sequences for only a subset of the receiver range searches. By doing so, only receivers within the distances corresponding to these range subsets successfully acquire a message sent in this manner. Also a transmitter may intentionally advance or delay a transmission such that receivers searching for one range subset during a specific interval are able to receive a message sent from a shorter or longer distance than these receivers were originally designed for, in accordance with this invention.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
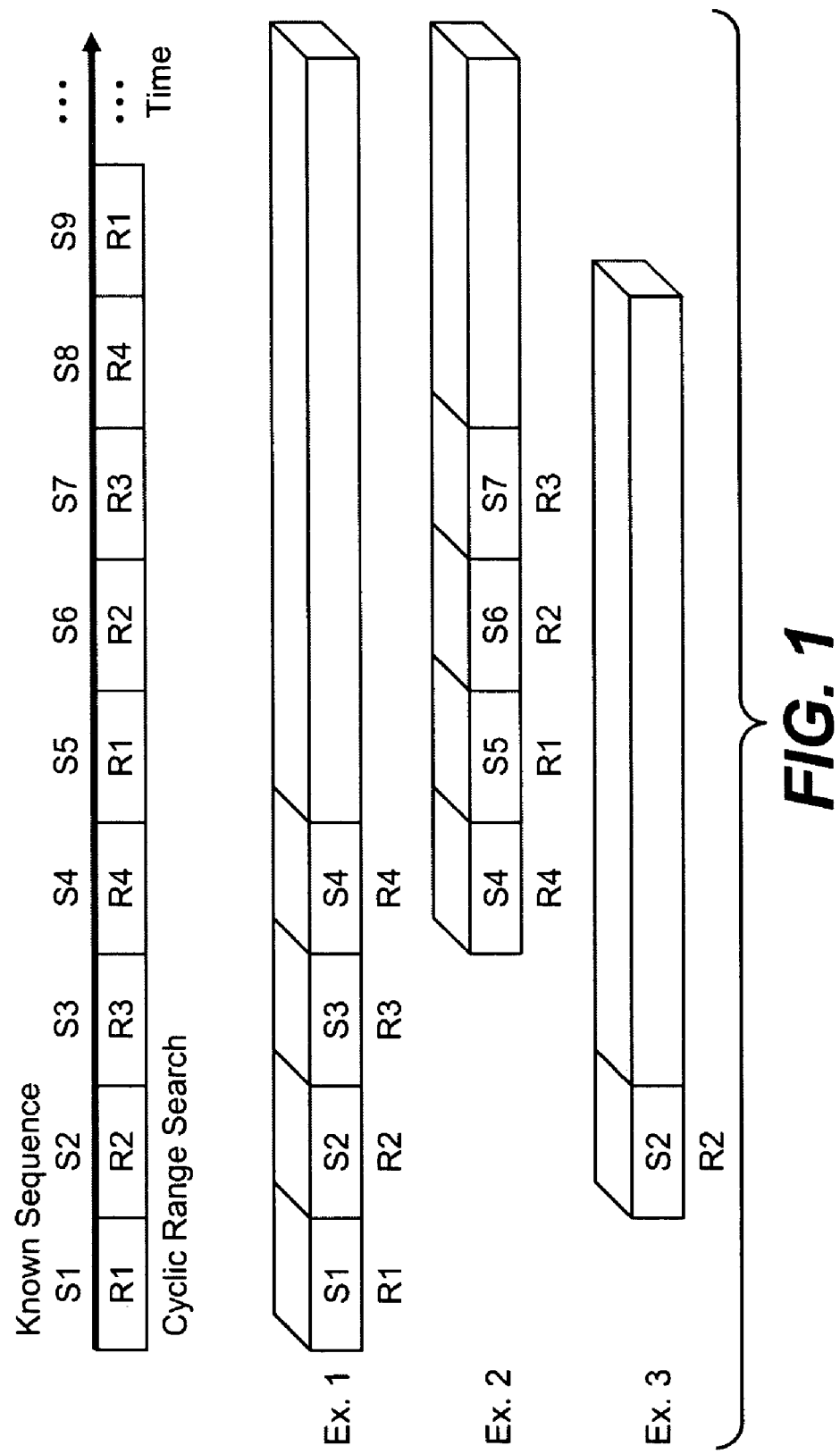
FIG. 1 is an sample instantiation that demonstrates with several examples the architecture and methodology for implementing the present invention.

It should be understood that one skilled in the art may, using the teachings of the present invention, vary embodiments shown in the drawings without departing from the spirit of the invention herein.

DETAILED DESCRIPTION OF THE INVENTION

The method and apparatus of the present invention may be hardware—such as a spread-spectrum receiver—that is hardwire programmed to perform the signal acquisition functions outlined herein (e.g., an ASIC), hardware running firmware, or hardware running software, with the software existing in memory, and which may be written in any computer language (such as C, C++, Perl, Java or the like), and the further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIG. 1, there is shown a block diagram sample instantiation that demonstrates the architecture and methodology for implementing the present invention. The signal acquisition function must acquire and synchronize a desired signal with reasonable probabilities of detection and false alarm. This enables subsequent demodulation and recovery of the information contained within the signal.

The uncertainty in arrival time can be bounded if the start time of any transmission is limited to some set of known allowable start times. Fortunately, this is typical of many LPD systems, and greatly simplifies the signal acquisition problem. Thus, the possible range of arrival time for a given allowable start time is determined by the possible range of propagation time and the possible range of time error between transmitter and receiver. The present architecture for signal acquisition with a cyclic range search functions with the assumption of knowledge of the possible range of arrival time.

FIG. 1 depicts an example implementation of Signal Acquisition with Cyclic Range Search. As shown in FIG. 1 is a time axis arrow showing transmitter start time intervals. Each time interval is long enough to contain the full length of a known sequence. Note that for an LPD system, the propagation time is a small fraction of the length of the known sequence. Each time interval has a unique known sequence associated with it, from the set (S1, S2, S3, S4, S5, S6, S7, S8, S9 . . . ), which can be any arbitrary set length of sequences, or, in general, a collection (S1, S2, S3 . . . Sn), where n=an integer, and Sn=the nth sequence of the collection. Note S1 is a single known sequence, while (S1, S2, S3 . . . ) is the collection of all known sequences. Thus a known sequence is a sequence of modulated symbols that is known to both the transmitter and the receiver; the known sequence precedes the data-bearing portion of the signal. S1 is a single known sequence from the collection of all known sequences (S1, S2, S3 . . . ). Further comprising the transmitted signal, the transmitted signal in its entirety comprises the subset of the collection of sequences and a subsequent data-bearing portion of the signal (the payload bearing information). The collection of all known sequences (S1, S2, S3, S4, S5, . . . ) is arbitrarily long. The known sequences included at the beginning of each signal are for the purposes of signal acquisition; they contain no encoded information. The signal subsequent to the known sequences carries the encoded payload data. The particular data encoding and other payload details are not important to the present invention; any encoding and packet or frame mechanism may be used.

During each interval a receiver searches for the known sequence over a particular range of arrival times. These arrival times correspond to possible distances between the transmitter and receiver. The possible arrival times are constrained by the speed at which the signal may travel, the speed of light in the medium of interest (approximately 186282 miles/s in a vacuum).

Each range of possible distances is searched in a cyclic manner by the receiver implementing the architecture of the present invention using acquisition signal processing blocks that operatively interact with hardware and/or software blocks that functionally contain the methodology described herein, and in particular the cyclic range search employing a collection of range subsets that map to a collection of sequences found in the received signal.

In the example of FIG. 1, the cyclic range search consists of a range, the finite collection (R1, R2, R3, R4), having four subsets of ranges that are searched repetitively (R1, R2, R3, R4, R1, R2 . . . etc) using hardware or software blocks, with the terms R1, R2, R3 . . . Rm can be termed range subsets, operatively part of the acquisition signal processing blocks of the receiver, while the collection of range subsets, (R1, R2, R3, R4) in FIG. 1, can be termed the range, or, more generally, (R1, R2, R3, . . . Rm), where m=an integer, and Rm=the mth range subset, with integer m less than the integer n above.

In the present invention, since both transmitter and receiver synchronously operate under a precise notion of time that is universally shared between both transmitter and receiver, the range subsets are defined entirely by the processing of the receiver on the receiver side; thus there is no range subset (R1, R2, R3 . . . ) transmitted along with the collection of sequences, but instead the range subsets are generated at the receiver side. The present invention requires some precise notion of time that is shared by both the transmitter and the receiver in order to have transmitter start times constrained to known intervals (GPS time is an example, but is not the only way in which to have transmitter and receive agree on a time). How precise the common notion of time must be depends on the specific implementation.

The time slots corresponding to the range subsets, corresponding to the propagation time of a signal transmitted from a transmitter to the receiver, are expressed in arbitrary units of time, e.g. microseconds (µs) or (us), $10^{-6}$ s, or, equivalently, since distance (d) and time (t) are directly proportional to one another, the time slots may be correlated to distance; i.e., $d=v*t$, where v=velocity of the spread spectrum signal, and is less than or equal to c, c=speed of light (approximately 186282 miles/s, a fixed maximum number). Alternatively and equivalently units for range may be expressed in the frequency domain rather than in the time domain, so it is understood by one of ordinary skill from the teachings herein that when referring to time duration for range subsets these other units such as distance are implied.

Though four (4) is the number of range subsets shown in FIG. 1, in general any other number of subsets of ranges other than four may be used, i.e. N subsets, as can be appreciated by one of ordinary skill from the teachings herein. Each range subset has a unique periodic correspondence or periodic mapping with a known sequence, but with the number of subsets of ranges (in FIG. 1, four such subsets are shown) always less than the finite set length of sequences (here at least nine such sequences are shown in FIG. 1, and, as indicated in FIG. 1 the sequence may extend to any arbitrary length), so the mapping is cyclical or repeating, each of said sequences defined by at least one range subset, with each range subset in general having several sequences associated with it (e.g. R1 maps to S1, R2 maps to S2, R3 maps to S3, R4 maps to S4, then repeating, R1 maps to S5, R2 maps to S6, R3 maps to S7, R4 maps to S8, then again, R1 maps to S9, and so on for the entire collection of sequences, so that if there was a sequence S13, R1 would map to it, while R2 would map to a sequence S14, and so on).

Thus during the acquisition of the transmitted signal there is a unique correspondence between a range subset and known sequence: the receiver searches for known sequence S1 during the search of range subset R1; S2 during the search of range subset R2; S3 during the search of range subset R3; S4 during the search of range subset R4; S5 during the search for range subset R1, S6 during the search of range subset R2, S7 during the search of range subset R3, and so on for the entire collection of sequences.

Also shown in FIG. 1 are three example transmitted spread-spectrum and/or LPD signals, by way of illustration and not limitation (for clarity the subsequent data-bearing portion of the signal is not shown in the FIGURE). The first signal, labeled Ex. 1, was transmitted starting in the first interval. In accordance with the architecture of the present invention, a transmitter (not shown) transmits the known symbols corresponding to the first four intervals occupied by the message for these four time intervals, i.e., (S1, S2, S3, and S4), along with the rest of the data-bearing portion of the signal. A receiver (not shown) built in accordance with the architecture of the present invention, performs a cyclic range search, and will by necessity detect the signal in one of these first four intervals, depending on the distance between transmitter and receiver.

For example, concerning Ex. 1 in FIG. 1, as well as the other examples Ex. 2 and Ex. 3, suppose that range subset R1 corresponds to distances from 0 to 25 miles (0-134 us), R2 corresponds to distances from 25 to 50 miles (134-268 us), R3 corresponds to distances from 50 to 75 miles (268-403 us), and R4 corresponds to distances from 75 to 100 miles (403-537 us). The numbers in parenthesis refer to propagation time as determined by the speed of light, c, assumed for illustrative purposes to be in a vacuum. If the actual distance between transmitter and receiver built in accordance with the architecture of the present invention is 85 miles, the receiver acquires known sequence S4 in the fourth range subset search R4. This is because the receiver is tuned to receive certain sequences during certain ranges only, and if a sequence is received during the wrong range, it will not be detected. Note 85 miles is equivalent to 456 us (µs, milliseconds) of propagation time between transmitter and receiver (85 mi/186282 mi/s=456 us). If sequence S1 is sent by the transmitter at this distance, it will take 456 us to reach the receiver. But S1 can only be detected by the receiver built in accordance with the architecture of the present invention during range subset R1, which is during a time interval of 0-134 us. Since the 456 us propagation delay falls outside this time interval, S1 cannot be acquired by the receiver during range subset R1. Similarly, for this example, S2 can only be detected during time interval 134-268 us, which is outside the propagation delay of 456 us, and S3 can only be detected during 268-403 us. The only sequence signal that the receiver for this example can find is S4, since S4 can be detected during range subset R4, 403-537 us, and the propagation time of 456 us falls within this range.

In the present invention, any errors between clocks in transmitter and receiver may be adjusted for, including errors due to general relativistic effects, and atmospheric effects that may alter the speed of the signal from the nominal speed of light 'c' in the medium of interest, and/or diminish the speed of the signal, compared to the absolute limit of the speed of light 'c' in a vacuum.

The example of Ex. 1 illustrates various principles of the present invention as outlined herein, including how uncertainty in arrival time at the receiver is bounded by the constrained transmitter start times, with the possible range of arrive times for a given allowable start time is determined by the possible range of propagation times and any time error between transmitter and receiver. The propagation time for detecting the known signal is only a relatively small fraction of the length of the known sequence so the range of possible arrival times that must be searched for by the acquisition processing circuits of the receiver are greatly reduced. Receiver processing circuit complexity is further reduced by the number of redundant known sequences. This allows a receiver to split its arrival time search into subsets of the total possible range of arrival times. Each range subset may be searched during consecutive intervals using consecutive known sequences. A receiver performs the arrival time search in a cyclic fashion, where the searches for each range subset are performed in some known order that repeats, in a sequential manner, e.g. in FIG. 1, (R1, R2, R3, R4, R1, R2 . . . ) (repeats). This is referred to as a "cyclic range search".

Turning attention now to the second signal in FIG. 1, designated as Ex. 2, there is shown a second signal transmitted beginning with the fourth interval. As a result, the transmitter includes known sequences S4, S5, S6, and S7 at the beginning of the message. From the previous example, a receiver 85 miles from the transmitter performing a cyclic range search as described acquires known symbol S4 during the first interval occupied by the signal. This is done as follows. Suppose the physical range or distance between transmitter and receiver is 10 miles, corresponding to a propagation time of 54 us (10 mi/186282 miles/s). Known sequence S4 sent by the transmitter will arrive at the receiver after 54 us. However, the receiver built according to the architecture of the present invention can only detect known sequence S4 in the range subset R4, which is during the time duration 403-537 us. Since the propagation time 54 us in this example is outside the range subset R4, the receiver will not find S4 during a predetermined elapsed time when the receiver searches for S4. The transmitter will then send out the next sequence following S4, namely S5. S5 can be detected during the range subset R1 (0-134 us), since R1 maps to S5 as well as S1, S9, S13, etc. Therefore, since the propagation time of 54 us is within the range subset R1 time duration, the receiver will pick up the sequence S5, and the receiver can thereby quickly acquire the signal of the transmitter.

The example of Ex. 2 shows how the cyclic range search of the present invention allows a receiver to acquire a signal regardless of which interval the signal transmission began—in this case, the signal transmission began with transmission of known sequence S4, which could not initially be detected. But the transmitter proceeded to transmit known sequence S5, which was successfully detected by the receiver. Thus, in general, at the worse case the receiver would have to transmit all the known sequences in the entire cyclic range—or equivalently, a receiver would have to perform the arrival time search for a signal using the cyclic range search over the entire range of the collection (R1, R2, R3 . . . ), which in this example is four (4) such transmission sequences (R1, R2, R3, R4)—but since the number of cyclic range transmissions (4) is less than the number of times required to transmit the entire known sequence of arbitrary fixed length (S1, S2, S3 . . . ), which is greater than four (4), this is still not too disadvantageous compared to the alternatives of not using the present invention.

The third example in FIG. 1, Ex. 3, shows a signal being used to create a distance-directed message transmission. Because the transmitter only included known sequence S2 in the transmission, only receivers within range subset R2 are able to acquire it. In the example given herein, R2 corresponds to distances from 25 to 50 miles (134-268 us).

Alternately, the transmitter built in accordance with the architecture of the present invention can intentionally advance or delay the message start time in such a manner that only receivers in any particular chosen range subset are able to acquire the message. This allows distance-directed transmissions beginning in any interval, regardless of actual distance.

From the description herein, it can be seen that the architecture of the present invention, when implemented in a spread-spectrum transmitter and receiver system employing LPD messages, allows for "ad hoc channel access": that is, the transmitter start time intervals need only be long enough to contain the full length of a known sequence, which in the example of FIG. 1 is the length of the known sequence S1 (which is identical to the length of any of the other known sequences S2, S3, and so on). A transmitter need never wait longer than the length of a known sequence (e.g. known sequence S1), which is much shorter than an entire message, before the transmitter can begin transmitting a LPD message. Compare the present invention architecture system to time-slotted or time-division multiple access (TDMA) systems, which have greater latency; hence the present invention has greater controlled latency.

Although the present invention has been described in terms of the preferred embodiments above, numerous modifications and/or additions to the above-described preferred embodiments would be readily apparent to one skilled in the art. As is readily apparent to one of ordinary skill using the teachings herein, any number of range subsets may be used (other than the four given in the illustrative sample instantiation of the example of FIG. 1), and the transmission ranges for the range subsets can correspond to any number of distances (or time durations), as dictated by the strength of the signal transmitted, the hardware used by transmitter and/or receiver, modulation and coding schemes used, and other factors as can be appreciated by one of ordinary skill.

It is intended that the scope of the present invention extends to all such modifications and/or additions and that the scope of the present invention is limited solely by the claims set forth below.

We claim:

1. A system for low probability of detection (LPD) signal acquisition comprising:

a receiver receiving a transmitted signal, said transmitted signal comprising:

a subset of a collection of sequences (S1, S2, S3 . . . Sn), where n=an integer, and Sn=the nth sequence of the collection;

said receiver having a acquisition signal processing block, said acquisition signal processing block comprising a finite collection of range subsets (R1, R2, R3, . . . Rm), where m=an integer, and Rm=the mth range subset; said range subsets mapped to said sequences in a periodic correspondence, with m<n; each of said range subsets corresponding to at least one of said sequences, in a repeating manner, wherein, said acquisition signal processing block searches to acquire said transmitted signal over a range of arrival times bounded by the propagation time of the transmitted signal and any time error between the receiver and a transmitter transmitting said transmitted signal, said range of arrival times defined by said range subsets, said acquisition signal processing block searches to acquire one of said sequences in said collection of sequences during a portion of time defined by a predetermined range subset, said acquisition signal processing block employs a cyclic range search to periodically search for said one of said sequences during a repeating range of said finite collection of range subsets, said acquisition signal processing block, during acquisition of said transmitted signal, proceeds to the next range subset in said finite collection of range subsets, whenever the one of said sequences is not found by said acquisition signal processing block during a predetermined elapsed time, and repeats this procedure until the one of said sequences is found during a range of arrive times defined by a predetermined range subset associated with said one of said sequences.

2. The invention of claim 1, further comprising:

said transmitter transmitting said transmitted signal, during a transmitter start time known to said receiver;

said transmitted signal comprising a collection of at least one predetermined sequence, said predetermined sequence collection smaller than the collection of sequences (S1, S2, S3 . . . Sn), said predetermined sequence collection having a correspondence with only a subset of said finite collection of range subsets, said subset of finite collection of range subsets being smaller than said finite collection of range subsets;

a plurality of receivers, each having said acquisition signal processing block; wherein, distance-directed message transmission is performed enabling communication between said transmitter and only said plurality of receivers comprised of those receivers able to acquire said predetermined sequence collection signal within said subset of said finite collection of range subsets.

3. The invention of claim 2, wherein:

said transmitter advancing and delaying transmitted signals, to create a plurality of said predetermined sequence collection signals, so that a plurality of receivers comprising said receivers able to acquire said predetermined sequence collection signal within said subset of said finite collection of range subsets are able to receive such advancing and delaying transmitted signals from shorter and longer distances than such receivers were designed for in the absence of such advancing and delaying.

4. The invention of claim 2, wherein:

said plurality of receivers receiving said predetermined sequence collection signals have means to estimate the distance between said receivers and said transmitter based on said range of arrival times bounded by the propagation time of the transmitted signal as constrained by the speed at which the transmitted signals travel, as bounded by the speed of light in the medium of interest that the transmitted signals travel.

5. The invention of 1, further comprising:

said transmitter transmitting said transmitted signal, during a transmitter start time known to said receiver;

said receiver acquisition signal processing block searches to acquire said transmitted signal over said range of arrival times, and said signal acquisition block comprises means for determining the distance between said transmitter and said receiver based on the range subset that receives at least one of said sequences and corresponds to said at least one sequence.

6. The invention of claim 1, further comprising:

said transmitter transmitting said transmitted signal, during a transmitter start time known to said receiver;

said sequences of said collection of sequences each having a time duration;

said transmitted signal in its entirety comprising said collection of sequences and a subsequent data-bearing portion of the signal, with said collection of sequences having a time duration longer than each of said sequences;

wherein said transmitter provides ad hoc channel access, as said transmitter need only wait long enough for the time duration of one of said sequences before transmitting the transmitted signal in its entirety.

7. The invention of claim 6, wherein:

said time duration for each of said sequences of said collection of sequences is the same, and said transmitted signal is a spread-spectrum signal.

8. A method for spread-spectrum signal acquisition comprising the steps of:

providing a spread-spectrum receiver to receive a spread-spectrum transmitted signal that comprises a subset of a collection of sequences (S1, S2, S3 . . . Sn), where n=an integer, and Sn=the nth sequence of the collection, the transmitted signal in its entirety comprising the subset of the collection of sequences and a subsequent data-bearing portion of the signal;

providing within the receiver an acquisition signal processing block, the acquisition signal processing block comprising a finite collection of range subsets (R1, R2, R3, . . . Rm), where m=an integer, and Rm=the mth range subset; said range subsets mapped to said sequences in a periodic correspondence, with m<n; each of said range subsets corresponding to at least one of said sequences, in a repeating manner, wherein, searching for the transmitted signal by the acquisition signal processing block, to acquire the transmitted signal over a range of arrival times bounded by the propagation time of the transmitted signal and any time error between the receiver and a transmitter transmitting the transmitted signal, with the range of arrival times defined by the range subsets, searching to acquire a predetermined one of the sequences in the collection of sequences during a portion of time defined by a predetermined range subset, searching to acquire the predetermined sequence from the collection of sequences using a cyclic search by the acquisition signal processing block, to periodically search for the predetermined sequence during a repeating range of the finite collection of range subsets performing the cyclic search by periodic searching from the repeating range of the finite collection of range subsets by sequentially proceeding to the next range subset in the finite collection of range subsets, whenever the predetermined sequence is not found by the acquisition signal processing block during a predetermined elapsed time;

repeating the procedure of performing the cyclic search until the predetermined sequence is found during a range of arrive times defined by a predetermined range subset associated with the predetermined sequence.

9. The method according to claim 8, further comprising the steps of:

transmitting the transmitted signal with said transmitter, during a transmitter start time known to the spread-spectrum receiver;

the transmitted signal comprising of a collection of at least one predetermined sequence, the predetermined sequence collection smaller than the collection of sequences (S1, S2, S3 . . . Sn) of the transmitted signal in its entirety, the predetermined sequence collection having a correspondence with only a subset of the finite collection of range subsets, the subset of finite collection of range subsets being smaller than the finite collection of range subsets;

receiving the transmitted signal with a plurality of receivers, each receiver having said acquisition signal processing block; wherein, a distance-directed message transmission is performed enabling communication between said transmitter and only said plurality of receivers comprised of those receivers able to acquire said predetermined sequence collection signal within said subset of said finite collection of range subsets.

10. The method according to claim 9, further comprising the steps of:

advancing and delaying transmitted signals with the receiver, to create a plurality of the predetermined sequence collection signals, so that a plurality of receivers comprising the receivers able to acquire said predetermined sequence collection signals within the subset of said finite collection of range subsets are able to receive these advancing and delaying transmitted signals from shorter and longer distances than the distances these receivers were designed for in the absence of such advancing and delaying.

11. The method according to claim 8, further comprising the steps of:
transmitting the transmitted signal with said transmitter, during a transmitter start time known to the spread-spectrum receiver;
estimating the distance between the transmitter and the receiver based on the range of arrival times bounded by the propagation time of the transmitted signal as constrained by the speed at which the transmitted signals travel, as bounded by the speed of light in the medium of interest that the transmitted signals travel.

12. The method according to claim 8, further comprising the steps of:
transmitting the transmitted signal with said transmitter, during a transmitter start time known to the receiver;
the sequences of the collection of sequences each having a time duration;
said transmitted signal in its entirety, with the collection of sequences, having a time duration longer than the time duration of each of the individual sequences in the collection;
the time duration for each of the sequences of the collection of sequences is substantially the same; and,
waiting, by the transmitter, before beginning transmission of the transmitted signal in its entirety, for a time duration greater than or equal to the time duration of one of the sequences but waiting less than the time duration of the transmitted signal in its entirety.

13. A spread-spectrum transmitter-receiver system that allows the receiver to acquire and synchronize to a desired low probability of detection (LPD) signal comprising:
means for transmitting a spread spectrum signal;
means for receiving the transmitted signal, said transmitted signal comprising a subset of the collection of sequences (S1, S2, S3 . . . Sn), where n=an integer, and Sn=the nth sequence of the collection;
said means for receiving having means for signal acquisition processing, said signal acquisition processing means comprising a finite collection of range subsets (R1, R2, R3, . . . Rm), where m=an integer, and Rm=the mth range subset; said range subsets mapped to said sequences in a periodic correspondence, with m<n; each of said range subsets corresponding to at least one of said sequences, in a repeating manner, wherein,
said acquisition signal processing means searches to acquire said transmitted signal over a range of arrival times bounded by the propagation time of the transmitted signal and any time error between the receiver and a transmitter transmitting said transmitted signal, said range of arrival times defined by said range subsets, and,
said acquisition signal processing means searches to acquire one of said sequences in said collection of sequences during a portion of time defined by a predetermined range subset, and,
said acquisition signal processing means employs a cyclic range search to periodically search for said one of said sequences during a repeating range of said finite collection of range subsets, wherein, said acquisition signal processing means, during acquisition of said transmitted signal, proceeds to the next range subset in said finite collection of range subsets, whenever the said one of said sequences is not found by said acquisition signal processing means during a predetermined elapsed time, and repeats this procedure until the said one of said sequences is found during a range of arrive times defined by a predetermined range subset associated with said one of said sequences.

14. The invention of claim 13, further comprising:
said transmitter means transmitting said transmitted signal, during a transmitter start time known to said receiver means;
said sequences of said collection of sequences each having an equal time duration;
said transmitted signal in its entirety comprising said collection of sequences and a subsequent data-bearing portion of the signal, with said collection of sequences having a time duration longer than each of said sequences;
wherein said transmitter means provides ad hoc channel access, as said transmitter need only wait long enough for the time duration of one of said sequences before transmitting the transmitted signal in its entirety, and,
a plurality of said receiver means, said plurality of receiver means receiving said predetermined sequence collection signals each have means to estimate the distance between said receiver means and said transmitter means based on said range of arrival times bounded by the propagation time of the transmitted signal as constrained by the speed at which the transmitted signals travel, as bounded by the speed of light in the medium of interest that the transmitted signals travel.

15. A system for low probability of detection (LPD) signal acquisition comprising:
a receiver receiving a transmitted signal, said transmitted signal comprising a subset of a collection of sequences (S1, S2, S3 . . . Sn), where n=an integer, and Sn=the nth sequence of the collection;
said receiver having a acquisition signal processing block, said acquisition signal processing block comprising a finite collection of range subsets (R1, R2, R3, . . . Rm), where m=an integer, and Rm=the mth range subset; said range subsets mapped to said sequences in a periodic correspondence, with m<n; each of said range subsets corresponding to at least one of said sequences, in a repeating manner, wherein,
said acquisition signal processing block searches to acquire said transmitted signal over a range of arrival times bounded by the propagation time of the transmitted signal and any time error between the receiver and a transmitter transmitting said transmitted signal, said range of arrival times defined by said range subsets,
said acquisition signal processing block searches to acquire one of said sequences in said collection of sequences during a portion of time defined by a predetermined range subset,
said transmitter transmitting said transmitted signal, during a transmitter start time known to said receiver;
said transmitted signal comprising a collection at least one predetermined sequence, said predetermined sequence collection smaller than the collection of sequences (S1, S2, S3 . . . Sn), said predetermined sequence collection having a correspondence with only a subset of said finite collection of range subsets, said subset of finite collection of range subsets being smaller than said finite collection of range subsets;

a plurality of receivers, each having said acquisition signal processing block; wherein, distance-directed message transmission is performed enabling communication between said transmitter and only said plurality of receivers comprised of those receivers able to acquire said predetermined sequence collection signal within said subset of said finite collection of range subsets.

16. A system for low probability of detection (LPD) signal acquisition comprising:
a receiver receiving a transmitted signal, said transmitted signal comprising a subset of a collection of sequences (S1, S2, S3 ... Sn), where n=an integer, and Sn=the nth sequence of the collection;
said receiver having a acquisition signal processing block, said acquisition signal processing block comprising a finite collection of range subsets (R1, R2, R3, ... Rm), where m=an integer, and Rm=the mth range subset; said range subsets mapped to said sequences in a periodic correspondence, with m<n; each of said range subsets corresponding to at least one of said sequences, in a repeating manner, wherein,
said acquisition signal processing block searches to acquire said transmitted signal over a range of arrival times bounded by the propagation time of the transmitted signal and any time error between the receiver and a transmitter transmitting said transmitted signal, said range of arrival times defined by said range subsets,
said acquisition signal processing block searches to acquire one of said sequences in said collection of sequences during a portion of time defined by a predetermined range subset,
said transmitter transmitting said transmitted signal, during a transmitter start time known to said receiver;
said receiver acquisition signal processing block searches to acquire said transmitted signal over said range of arrival times, and said signal acquisition block comprises means for determining the distance between said transmitter and said receiver based on the range subset that receives at least one of said sequences and corresponds to said at least one sequence.

17. A system for low probability of detection (LPD) signal acquisition comprising:
a receiver receiving a transmitted signal, said transmitted signal comprising a subset of a collection of sequences (S1, S2, S3 ... Sn), where n=an integer, and Sn=the nth sequence of the collection;
said receiver having a acquisition signal processing block, said acquisition signal processing block comprising a finite collection of range subsets (R1, R2, R3, ... Rm), where m=an integer, and Rm=the mth range subset; said range subsets mapped to said sequences in a periodic correspondence, with m<n; each of said range subsets corresponding to at least one of said sequences, in a repeating manner, wherein,
said acquisition signal processing block searches to acquire said transmitted signal over a range of arrival times bounded by the propagation time of the transmitted signal and any time error between the receiver and a transmitter transmitting said transmitted signal, said range of arrival times defined by said range subsets,
said acquisition signal processing block searches to acquire one of said sequences in said collection of sequences during a portion of time defined by a predetermined range subset, said acquisition signal processing block employs a cyclic range search to periodically search for said one of said sequences during a repeating range of said finite collection of range subsets,
said transmitter transmitting said transmitted signal, during a transmitter start time known to said receiver;
said sequences of said collection of sequences each having a time duration;
said transmitted signal in its entirety comprising said collection of sequences and a subsequent data-bearing portion of the signal, with said collection of sequences having a time duration longer than each of said sequences;
wherein said transmitter provides ad hoc channel access, as said transmitter need only wait long enough for the time duration of one of said sequences before transmitting the transmitted signal in its entirety.

18. A method for spread-spectrum signal acquisition comprising the steps of:
providing a spread-spectrum receiver to receive a spread-spectrum transmitted signal that comprises a subset of a collection of sequences (S1, S2, S3 ... Sn), where n=an integer, and Sn=the nth sequence of the collection, the transmitted signal in its entirety comprising the subset of the collection of sequences and a subsequent data-bearing portion of the signal;
providing within the receiver a acquisition signal processing block, the acquisition signal processing block comprising a finite collection of range subsets (R1, R2, R3, ... Rm), where m=an integer, and Rm=the mth range subset; said range subsets mapped to said sequences in a periodic correspondence, with m<n; each of said range subsets corresponding to at least one of said sequences, in a repeating manner, wherein,
searching for the transmitted signal by the acquisition signal processing block, to acquire the transmitted signal over a range of arrival times bounded by the propagation time of the transmitted signal and any time error between the receiver and a transmitter transmitting the transmitted signal, with the range of arrival times defined by the range subsets, searching to acquire a predetermined one of the sequences in the collection of sequences during a portion of time defined by a predetermined range subset, searching to acquire the predetermined sequence from the collection of sequences using a cyclic search by the acquisition signal processing block, to periodically search for the predetermined sequence during a repeating range of the finite collection of range subsets;
transmitting the transmitted signal with said transmitter, during a transmitter start time known to the spread-spectrum receiver;
the transmitted signal comprising of a collection of at least one predetermined sequence, the predetermined sequence collection smaller than the collection of sequences (S1, S2, S3 ... Sn) of the transmitted signal in its entirety, the predetermined sequence collection having a correspondence with only a subset of the finite collection of range subsets, the subset of finite collection of range subsets being smaller than the finite collection of range subsets;
receiving the transmitted signal with a plurality of receivers, each receiver having said acquisition signal processing block; wherein, a distance-directed message transmission is performed enabling communication between said transmitter and only said plurality of receivers comprised of those receivers able to acquire said predetermined sequence collection signal within said subset of said finite collection of range subsets.

19. A method for spread-spectrum signal acquisition comprising the steps of:
  providing a spread-spectrum receiver to receive a spread-spectrum transmitted signal that comprises a subset of a collection of sequences (S1, S2, S3 ... Sn), where n=an integer, and Sn=the nth sequence of the collection, the transmitted signal in its entirety comprising the subset of the collection of sequences and a subsequent data-bearing portion of the signal;
    providing within the receiver a acquisition signal processing block, the acquisition signal processing block comprising a finite collection of range subsets (R1, R2, R3, ... Rm), where m=an integer, and Rm=the mth range subset; said range subsets mapped to said sequences in a periodic correspondence, with m<n; each of said range subsets corresponding to at least one of said sequences, in a repeating manner, wherein,
  searching for the transmitted signal by the acquisition signal processing block, to acquire the transmitted signal over a range of arrival times bounded by the propagation time of the transmitted signal and any time error between the receiver and a transmitter transmitting the transmitted signal, with the range of arrival times defined by the range subsets, searching to acquire a predetermined one of the sequences in the collection of sequences during a portion of time defined by a predetermined range subset, searching to acquire the predetermined sequence from the collection of sequences using a cyclic search by the acquisition signal processing block, to periodically search for the predetermined sequence during a repeating range of the finite collection of range subsets;
  transmitting the transmitted signal with said transmitter, during a transmitter start time known to the spread-spectrum receiver; and
  estimating the distance between the transmitter and the receiver based on the range of arrival times bounded by the propagation time of the transmitted signal as constrained by the speed at which the transmitted signals travel, as bounded by the speed of light in the medium of interest that the transmitted signals travel.

20. A method for spread-spectrum signal acquisition comprising the steps of:
  providing a spread-spectrum receiver to receive a spread-spectrum transmitted signal that comprises a subset of a collection of sequences (S1, S2, S3 ... Sn), where n=an integer, and Sn=the nth sequence of the collection, the transmitted signal in its entirety comprising the subset of the collection of sequences and a subsequent data-bearing portion of the signal;
  providing within the receiver a acquisition signal processing block, the acquisition signal processing block comprising a finite collection of range subsets (R1, R2, R3, ... Rm), where m=an integer, and Rm=the mth range subset; said range subsets mapped to said sequences in a periodic correspondence, with m<n; each of said range subsets corresponding to at least one of said sequences, in a repeating manner, wherein,
  searching for the transmitted signal by the acquisition signal processing block, to acquire the transmitted signal over a range of arrival times bounded by the propagation time of the transmitted signal and any time error between the receiver and a transmitter transmitting the transmitted signal, with the range of arrival times defined by the range subsets, searching to acquire a predetermined one of the sequences in the collection of sequences during a portion of time defined by a predetermined range subset, searching to acquire the predetermined sequence from the collection of sequences using a cyclic search by the acquisition signal processing block, to periodically search for the predetermined sequence during a repeating range of the finite collection of range subsets; and
  transmitting the transmitted signal with said transmitter, during a transmitter start time known to the receiver;
    the sequences of the collection of sequences each having a time duration;
    said transmitted signal in its entirety, with the collection of sequences, having a time duration longer than the time duration of each of the individual sequences in the collection;
    the time duration for each of the sequences of the collection of sequences is substantially the same; and,
  waiting, by the transmitter, before beginning transmission of the transmitted signal in its entirety, for a time duration greater than or equal to the time duration of one of the sequences but waiting less than the time duration of the transmitted signal in its entirety.

* * * * *